United States Patent
Koch et al.

(10) Patent No.: US 6,807,979 B2
(45) Date of Patent: Oct. 26, 2004

(54) DEVICE FOR COUPLING TWO STORAGE AND/OR TRANSPORT MEANS WITH A CLEANING DEVICE

(75) Inventors: Martin Koch, Neuenburg (DE); Bernd Elsässer, Ballrechten-Dottingen (DE); Klaus Moeller, Freiburg (DE)

(73) Assignee: GEA Buck Valve GmbH, Müllheim (DE)

( * ) Notice: Subject to any disclaimer, the term of this patent is extended or adjusted under 35 U.S.C. 154(b) by 0 days.

(21) Appl. No.: 10/362,041

(22) PCT Filed: Mar. 6, 2001

(86) PCT No.: PCT/DE01/00853

§ 371 (c)(1),
(2), (4) Date: Jun. 26, 2003

(87) PCT Pub. No.: WO02/18247

PCT Pub. Date: Mar. 7, 2002

(65) Prior Publication Data

US 2004/0094211 A1 May 20, 2004

(30) Foreign Application Priority Data

Aug. 28, 2000 (DE) .......................................... 200 14 872

(51) Int. Cl.$^7$ .......................... B08B 9/032; F16L 29/00; F16L 37/08; F16L 37/28
(52) U.S. Cl. ............. 137/240; 134/166 R; 137/614.01; 137/614.06; 141/346; 141/351; 141/364; 141/383; 222/148
(58) Field of Search ................................ 137/240, 614, 137/614.01, 614.06; 141/85, 89, 346, 351, 364, 383; 222/148; 134/166 C, 166 R

(56) References Cited

U.S. PATENT DOCUMENTS 5,095,946 A    3/1992  McLennan
5,295,507 A  *  3/1994  Bandy et al. .......... 137/614.06
5,490,546 A  *  2/1996  Lhoest ...................... 141/346
5,507,313 A  *  4/1996  LeDevehat ............. 137/614.05
5,540,266 A  *  7/1996  Grau et al. ................. 141/383
5,690,152 A  * 11/1997  Koch et al. ................. 141/346
5,718,270 A  *  2/1998  Grau et al. ................. 141/383
5,884,660 A  *  3/1999  Cathrein et al. ....... 137/614.01
6,311,745 B1 * 11/2001  Welch et al. ............... 141/346
6,315,013 B1 * 11/2001  Lardieri ...................... 141/383
6,412,518 B1 *  7/2002  Pieri ..................... 137/614.01

FOREIGN PATENT DOCUMENTS

| DE | 43 42 962 | 2/1995 |
| DE | 195 20 409 | 10/1996 |
| DE | 299 15 973 | 3/2001 |
| EP | 0 554 096 | 8/1993 |
| GB | 888541 | 1/1962 |

\* cited by examiner

Primary Examiner—George L. Walton
(74) Attorney, Agent, or Firm—Schiff Hardin LLP

(57) ABSTRACT

A device and method are provided for coupling two storage and/or transport units with a cleaning device. In one cleaning position, either before or after a transfer process, an area is provided between two connecting branches and at least one part of front flaps of two closing valves and the connecting valves which is embodied as a cleaning chamber enclosed on all sides, and which can be sealed with respect to the outside atmosphere and product area. The cleaning space is protected against unintentional opening as a result of at least partial locking of the connecting branches with respect to each other. Cleaning occurs using the cleaning fluid without any danger of contamination be it from transfer product and/or the atmosphere.

22 Claims, 2 Drawing Sheets

DEVICE FOR COUPLING TWO STORAGE AND/OR TRANSPORT MEANS WITH A CLEANING DEVICE

BACKGROUND OF THE INVENTION

An apparatus couples two storage and/or transport units, for instance in the form of vessels, containers, tubes and/or the like, for a transfer of a product from a first storage and/or transport unit having a first closing flap in a first pipe socket at a first end and in an active connection with at least one shaft into a second storage and/or transport unit having a second closing flap in a second pipe socket at a second end and in an active connection with the at least one shaft. The closing flaps are movable from a closed position, wherein the first closing flap tightly closes the first storage and/or transport unit off from the atmosphere at the first end, the second closing flap tightly closes the second storage and/or transport means off from the atmosphere at the second end and wherein the two closing flaps and/or the two pipe sockets are movable relative to one another into a cleaning position. The two closing flaps and/or the two pipe sockets are spaced from one another upon limitation of a cleaning space connectable to a cleaning device. Upon actuation of the at least one shaft into an open position, the closing flaps lie on one another. At least one flow-through opening for the product is open from the first storage and/or transport unit into the second storage and/or transport unit. The flaps are movable from the open position into the cleaning position upon actuation of the at least one shaft as well as into the closed position.

Such an apparatus is disclosed, for example, by DE 195 20 409 C1, whereby the cleaning device comprises a blower and extraction device that enables a cleaning of the closing flaps with a gas before and/or after a product transfer or refilling event is to be accomplished with the apparatus. A seal is thereby utilized that, given a spacing of the closing flaps of, preferably, less than 15 mm, disadvantageously seals the space situated between the closing flaps, i.e. the impact chamber, off from the outside, with the exception of the regions of the bearing shells thereof. Given the known apparatus, there is the risk of contamination of both the product to be refilled as well as of the atmosphere. Due to leakage, a cleaning of the impact chamber is also impossible.

A sealing of the impact chamber from at least a part of the closing flaps is disclosed by DE 299 15 973 An interspace between the closing flaps that is sealed relative to the impact chamber thereby assures that dust that is potentially stirred up due to a scrubbing cannot proceed onto the end face regions, and the extraction cross-section for a cleaning gas, protective atmosphere and/or the like together with particles to be removed is made smaller at the same time, so that the volume stream for the extraction is increased and a greater extraction power is created.

GB Letters Patent 888,541 also discloses a device for coupling two containers, whereby the pipe sockets are rotatable relative to one another, so that a bayonet closure is locked or unlocked and, at the same time, the closing flaps are forced from the closed position into the open position or from the open position into the closed position by turning the pipe sockets relative to one another, so that the locking position coincides with the open position. Such a lock is particularly disadvantageous in that the closing flaps can unintentionally detach from one another while changing from the closed position into the open position or vice versa, also due to the employment of only one bayonet closure. Moreover a cleaning before and/or after a refilling event in the open position is not possible in a locked condition in order to avoid contamination of the atmosphere and/or the product to be refilled.

SUMMARY OF THE INVENTION

It is therefore an object of the present invention to improve an apparatus such that the disadvantages of the Prior Art are overcome, particularly such that a cleaning of the cleaning space, even in the region of the bearing of the closing flaps, is possible without contaminating the atmosphere and/or a product to be refilled. Moreover, a dependable closing of the closing flaps and/or pipe sockets relative to one another should be assured before opening the flow-through opening(s) for a refilling event as well as after closing the flow-through opening(s), particularly in the cleaning position.

This object is achieved by a first, essentially annular seal between the first closing flap and the first pipe socket, a second essentially annular seal between the second closing flap and the second pipe socket, a third essentially annular seal between the first pipe socket and the second pipe socket and a fourth essentially annular seal between the second pipe socket and a second shaft section that cooperates with at least one shaft and is firmly connected to the second closing flap, whereby the first, second, third and fourth seals seal the cleaning space off from both the atmosphere as well as the product.

DESCRIPTION OF THE PREFERRED EMBODIMENT

Figure 1:
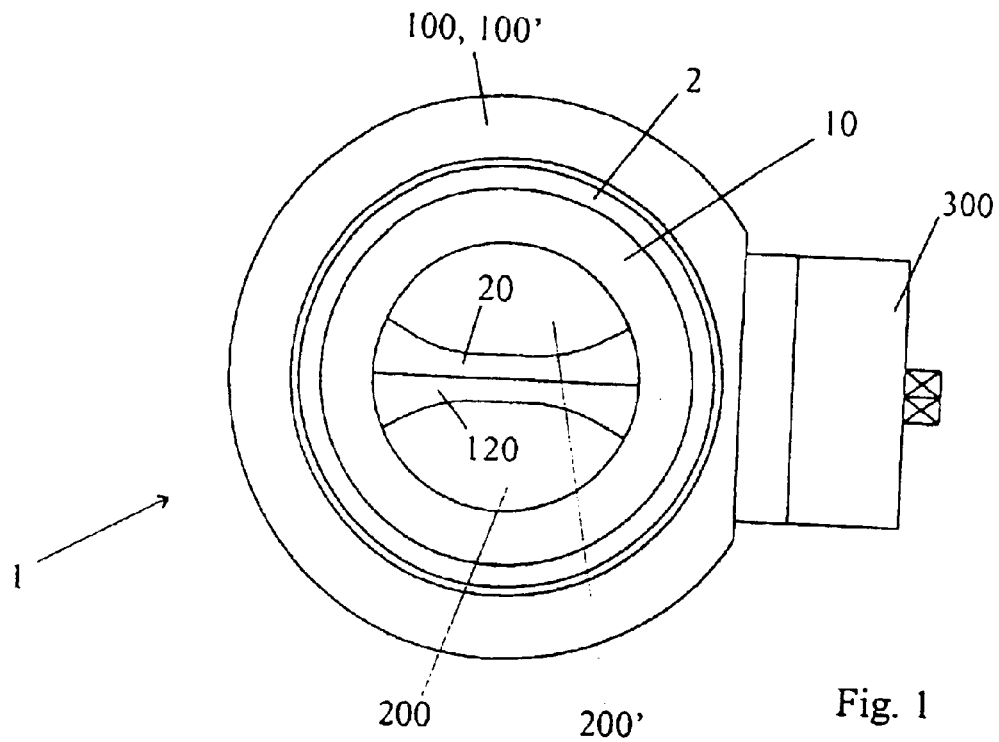
FIG. 1 is a cross-sectional view through an apparatus wherein the closing flaps are in their open position.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

In the disclosed embodiment, the first shaft section is a semi-axis, the second shaft section is connected to the second closing flap via a second semi-axis, and the first semi-axis and the second semi-axis complement one another to form a full axis.

The preferred embodiment is characterized by an actuation device via which a safety device can be driven for changing from the closed position into a locked position wherein the two storage and/or transport units are sealed relative to one another and the two closing flaps and/or the two pipe sockets are firmly joined to one another. A swivel device can be driven for changing from the locked position into the open position as well as from the open position into the locked position. Subsequently, the safety device can be driven for changing from the locked position into the closed position.

The actuation device comprises a gear device with a drive shaft and at least two output shafts, whereby the two output shafts can be addressed by the drive shaft in alternation.

The safety device has an active connection with, on the one hand, the first output shaft and, on the other hand, with the two pipe sockets, whereby the safety device preferably comprises a connection element between the first pipe socket and the second pipe socket that can be turned around a first axis for locking the two pipe sockets relative to one another or for unlocking them, particularly via at least one bayonet closure.

The swivel device has an active connection with, on the one hand, the second output shaft forming at least one shaft and, on the other hand, with at least one of the two closing flaps for turning the closing flaps around a second axis, whereby the swivel device preferably comprises the two semi-axes.

The cleaning position can be approached both between the closed position and the locked position as well as between the open position and the locked position with closing flaps and/or pipe sockets that are at least partly firmly connected to one another.

The connecting element comprises at least one projection or at least one recess and each projection or each recess of the connecting element is in firm engagement with a recess or a projection of the first pipe socket and/or of the second pipe socket in the locked position. Each projection or each recess of the connecting element or of the pipe socket or sockets preferably describes or describe an angle relative to the first axis, at least in regions, in order—by turning the connecting element around the first axis—to move the closing flaps away from one another, particularly between the open position and the locked position or toward one another, particularly between the closed position and the locked position.

The first closing flap comprises a first end face with at least one depression and/or elevation, the second closing flap comprises a second end face complementary with the first end face, and the two end faces lie tightly against one another, at least in the open position. Thus in the cleaning position, the end faces are preferably sealed relative to one another in the region of the at least one depression and/or elevation, and the cleaning space is essentially annular.

The first closing flap comprises at least one first recess at its side lying opposite the first end face and/or the second closing flap comprises at least one second recess at its side lying opposite the second end face for enlarging the flow-through opening or flow-through openings in the open position, whereby the first recess and/or the second recess is or are essentially spherical segment-shaped.

In the open position, the first closing flap is at least partially in engagement with the second pipe socket and/or the second closing flap is at least partially in engagement with the first pipe socket.

The first closing flap and/or the second closing flap comprises or comprise at least one partially annular projection, preferably two partially annular projections lying opposite one another, concentrically relative to the second axis for engagement into at least one partially annular recess in the first pipe socket and/or in the second pipe socket.

Alternatively, the first closing flap and/or the second closing flap comprises or comprise at least one partially annular channel, preferably two partially annular channels lying opposite one another, concentrically arranged relative to the second axis for engagement into at least one partially annular recess in the first pipe socket and/or in the second pipe socket.

The second axis resides essentially perpendicular to the first axis.

The first closing flap is a component part of a passive valve and the second closing flap is a component part of an active valve, whereby the second semi-axis is preferably firmly connected to the second output shaft.

The cleaning device comprises a blower and extraction device for flooding the cleaning space with a fluid cleaning agent.

The first, second, third and/or fourth seals is or are resistant to acids and/or bases.

The cleaning space acts as sluice.

The cleaning space can be brought to a pressure below atmospheric pressure and/or the pressure in the region of the flow-through opening.

A sensing unit for determining the product concentration in the cleaning space, particularly in an active connection with the actuation device.

Given downward crossing of a selectable limit value of the defined product concentration, the actuation device can be enabled for driving the closing flap into the closed position.

In a cleaning position both before as well as after a refilling event, a region between the pipe sockets and at least a part of the end faces of the closing flaps, what is referred to as the impact chamber, that is implemented for the first time as a cleaning space closed on all sides that is sealed relative to the outside atmosphere as well as relative to the product space and that is potentially protected against being unintentionally broken open due to an at least partial locking of the pipe sockets relative to one another, can be cleaned, even with a cleaning fluid, without risk of contamination, whether of the product to be refilled and/or of the atmosphere. Particularly given utilization of a single actuation device, further, a safety device and a swiveling device can be addressed in alternation, i.e. not at the same time, so that, after coupling two containers, the pipe sockets are firmly locked to one another via the swiveling device by, for example, turning a drive shaft over 90° upon interim formation of the cleaning space, so that a parting of the pipe sockets is impossible in the cleaning position, whereas the closing flaps in the pipe sockets see to a tight closure of the of the pipe sockets, and, by subsequently turning the drive shaft from 90° to 180°, the closing flaps are turned into their open position via the swiveling device in order to enable a refilling event. By turning the drive shaft back from 180° to 90°, the closing flaps are returned into their closed position, and, by turning from 90° to 0°, the cleaning space is opened, cleaned in the interim, and the pipe sockets are subsequently separated from one another.

As can be derived from FIG. 1, the apparatus 1 comprises a first pipe socket 10 at a first container (not shown) that, as soon as the first container is coupled to a second container (not shown), is seated in a second, bipartite pipe socket 100, 100' of the second container upon interposition of a connecting element or connecting ring 2. Two valves 20, 120 are in turn seated in the two pipe sockets, 10, 100, 100', where the first valve 20 can be passive and the second valve 120 can be active, so that only the active valve 120 can be actively actuated upon utilization of a gear device 300 for opening or closing flow-through openings 200, 200' from the first container to the second container.

Figure 2:
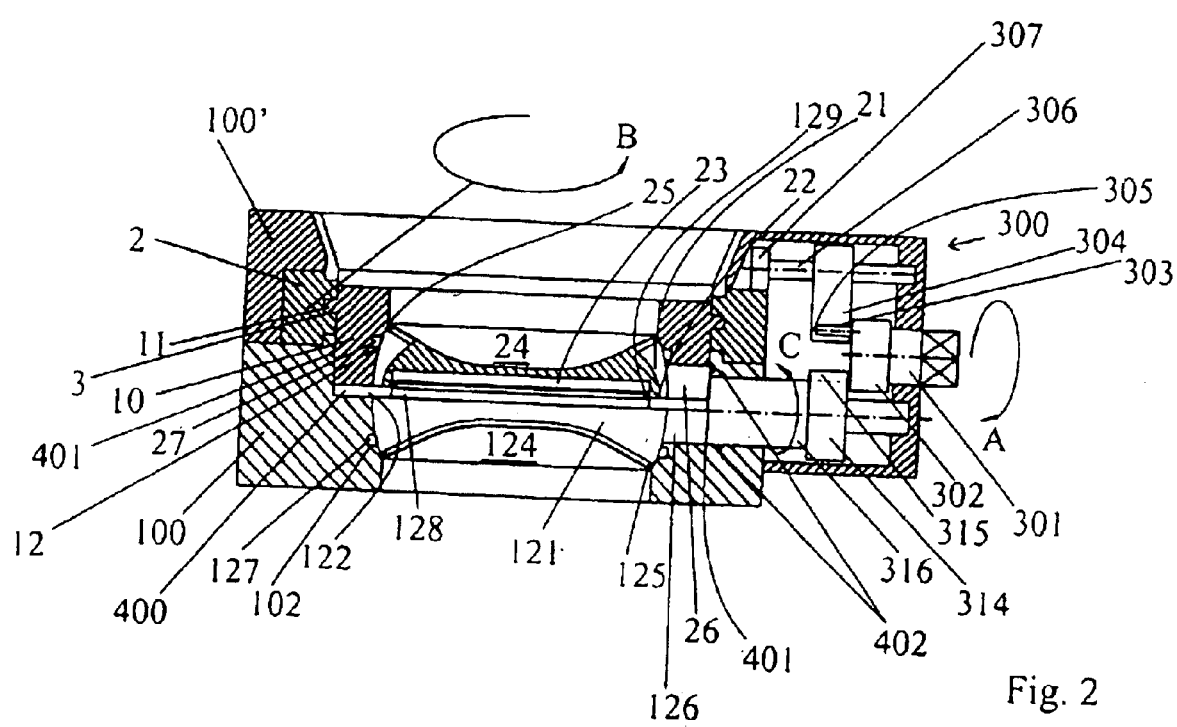
FIG. 2 is a longitudinal sectional view of the apparatus shown in FIG. 1 wherein the closing flaps are in their cleaning position.
Figure 4:
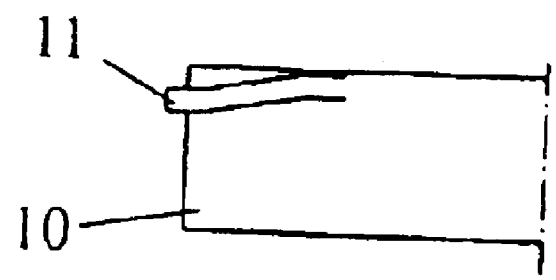
FIG. 4 is a partial view of a connecting ring that is employable in an apparatus according to FIGS. 1 and 2.

In the cleaning position shown in FIG. 2, the second pipe socket 100, 100' embraces the connecting ring 2 that in turns attaches the first pipe socket 10, so that the pipe sockets 10, 100, 100' cannot move relative to one another. For this purpose, the connecting ring 2 is provided with two recesses 3 that lie opposite one another and extend along the inside circumference and into which a respective projection 11 of the first pipe socket 10 can engage, whereby each projection 11 extends at least partially in curved form along the outside circumference of the first pipe socket 10, as shown in FIG. 4.

The first pipe socket 10 also comprises two recesses 12 lying opposite one another into which the passive valve 20 engages in the locked position according to FIG. 2. The passive valve 20 in turn comprises a flap 21 having an end face 22 in which a depression 23 is formed and a spherical segment-shaped recess 24 at the side lying opposite the end face 22. Further, the passive valve 20 is sealed relative to the first pipe socket 10 by means of a flap seal 25 and is firmly connected to a first shaft section comprising a first semi-axis 26. Finally, the passive valve 20 also comprises two projections 27 for engagement into the recesses 12.

In an analogous way, the active valve 120 is seated in the second pipe socket 100 by engagement into two recesses 102 lying opposite one another. The active valve 120 in turn comprises a flap 121 with an end face 122, from which a projection 127 is salient, and a spherical segment-shaped recess 124 at the side lying opposite the end face 122. The active valve 120 is also sealed relative to the second pipe socket 100 upon utilization of a flap seal 125. The flap 121 of the active valve 120 is firmly designed with a second shaft section comprising a second semi-axis 126. Further, projections 127 are offered for engagement into the recesses 102 according to FIG. 2 of the active valve 120. Moreover, a further flap seal 129 is provided between the two flaps 21, 121 in the region of the depression 23 into which the elevation 128 according to FIG. 2 partly engages.

Figure 3:
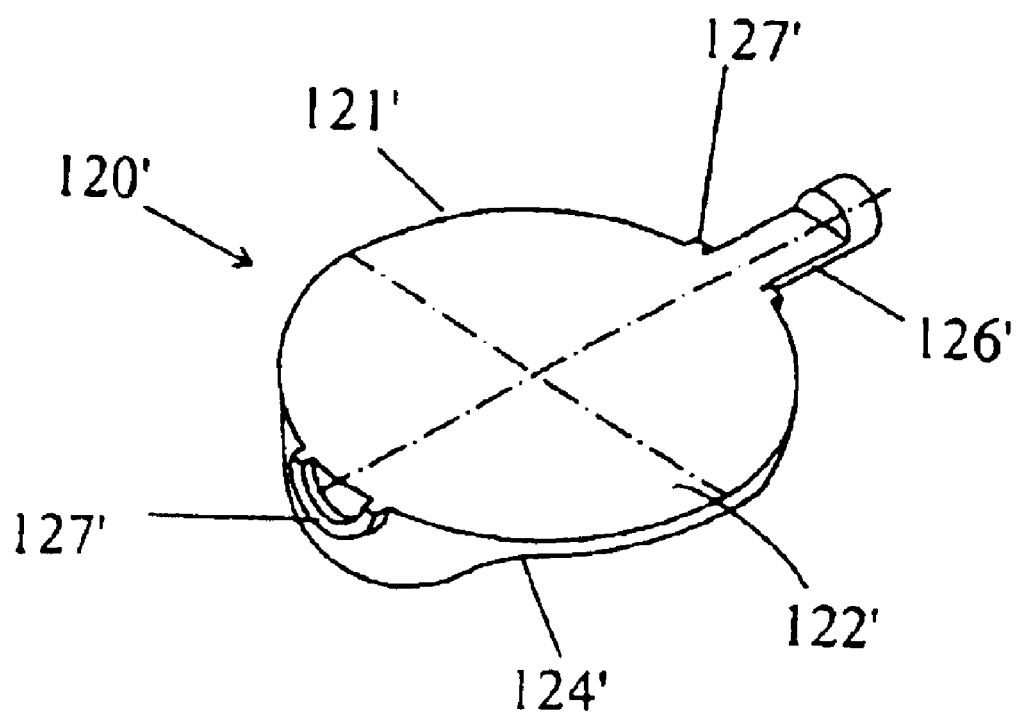
FIG. 3 is a perspective view of a closing flap that is employable with an apparatus according to FIGS. 1 and 2.

An alternative active valve 120' is shown in FIG. 3. The active valve 120' thereby comprises a flap 121' with a planar end face 122' and a spherical segment-shaped recess 124' at its side lying opposite the end face 122'. Further, the flap 121' is provided with a semi-axis 126' at one side, two semicircular projections 127 proceeding concentrically to the longitudinal axis thereof.

According to FIG. 2, the gear device 300 comprises a drive shaft 301 with a disk 302 and a plug 303 that attaches in alternating fashion at a disk 304 with a recess 305 for driving a first output shaft 306 or at a disk 314 with a recess 315 for driving a second output shaft 316. The first output shaft 306 is also connected to a disk 307 that attaches at the connecting ring 2 for turning the latter, whereas the second output shaft 316 merges into the first semi-axis 126 for actuating the active valve 120.

In the cleaning position shown in FIG. 2, finally, a cleaning space 400 closed at all sides is provided between the pipe sockets 10, 100 as well as the flaps 21, 121. For sealing the cleaning space 400 off from the atmosphere, a first ring seal 401 is arranged between the two pipe sockets 10, 100 and a second ring seal 402 is arranged between the second pipe socket 100 and the second output shaft 316. A seal relative to the product space, in contrast, is assured by the flap seals 25 and 125. Moreover, there is a seal relative to an interspace between the closing flaps 21, 121 as a result of the further flap seal 129. The cleaning space 400 can also be connected to a cleaning device (not shown) that in turn comprises a blower and extraction device.

The apparatus whose structure has just been described with reference to the Figures works, for example, in the following way.

First, the first pipe socket 10 together with the passive valve 20 is inserted into the second pipe socket 100, 100' as well as the connecting ring 2 until the first pipe socket 10 comes to lie on the second pipe socket 100.

When the drive shaft 301 is then turned in the direction of the arrow A in FIG. 2, the plug 303 engages into the recess 305 in the disk 304 in order to transmit the rotary motion onto the first output shaft 306. Upon utilization of the disk 307, the first output shaft 306 then compels a rotation of the connecting ring 2 in the direction of arrow B in FIG. 2, so that the projections 11 of the first pipe socket 10 engage into the corresponding recesses 3 of the connecting ring, which leads to a locking of the pipe sockets 10, 100, 100; in the fashion of a bayonet closure. Due to the curvature of the projections 11 of the first pipe socket 10, a lowering of the first pipe socket 10 on the second pipe socket 100 simultaneously occurs given the rotation of the connecting ring 2 in the direction of the arrow B, so that the cleaning space 400 arises. As shown in FIG. 2, thus cleaning space is sealed off both from the atmosphere as well as from the region between the end faces 22, 122 in the cleaning device sealed by the flap seal 129. The cleaning space 400 can then be flooded with a cleaning gas or a cleaning fluid in order to remove residual contaminants risk-free before a refilling event without contaminating the sealed end face regions. An acid and/or base can thereby be employed for cleaning on the basis of a suitable selection of the material of the seals 25, 125, 129, 401 and 402, which insure a tight closing of the cleaning space 400. After the cleaning, the drive shaft 301 is turned farther upon simultaneous, further locking and further lowering of the first pipe socket 10 relative to the second pipe socket 100, namely until the end faces 22, 122 of the closing flaps 21, 121 lies tightly against one another in the locked position.

A further rotation of the drive shaft 301 causes the plug 303 to disengage from the recess 305 and engage into the recess 315 of the disk 314, so that a further rotary motion in the direction of the arrow A is transmitted onto the second output shaft 316. Given continued rotation of the drive shaft 301, a turning of the valves 20, 120 into the open position shown in FIG. 1 occurs, whereby the projections 27 at the first flap 21 simultaneously engage into the recesses 102 of the second pipe socket 100 and the projections 127 at the second flap 121 simultaneously engage into the recesses 12 of the first pipe socket, which leads to a locking of the valves 20, 120 to the pipe sockets 10, 100, 100' that makes it impossible to part the valves 20, 120 from one another in the open position. In the open position, a product (not shown) can flow from the first container into the second container through the flow-through openings 200, 200'

After the end of the product refilling, the drive shaft 301 can be rotated back into its initial position, i.e. opposite the rotational sense A in FIG. 2, whereby, via rotation of the second output shaft 316, the closing flaps 21, 121 are again turned into their respective pipe sockets 10, 100 up into the locked position for sealing the containers relative to one another. The plug 303 then again changes from the recess 315 into the recess 305 in order to turn the connecting ring 2 via the first output shaft 306 and into the cleaning position shown in FIG. 2, wherein a renewed cleaning of the cleaning space 400 is then possible. When the initial position of the drive shaft 301 is reached, finally, the interlock is cancelled by releasing the connection between the projections 11 and the recesses 3, so that the two containers can then be separated from one another in turn.

In summary, it is therefore to be pointed out that the following stages can be successively run with the apparatus by actuating only the drive shaft 301:

1. Locking the pipe sockets 10, 100, 100' relative to one another given simultaneous sealing of the cleaning space 400;
2. Cleaning the sealed cleaning space 400 in the cleaning position;
3. Closing the cleaning space 400 until the locked position is reached;
4. Opening the flow-through openings 200, 200' given simultaneous locking of the closing flaps 21, 121 to the pipe sockets 10, 100;
5. Refilling a product from the first container into the second container;
6. Closing the flow-through openings 200, 200' while simultaneously releasing the lock between the closing flaps 21, 121 and the pipe sockets 10, 100;
7. Opening the cleaning space 400 in the partially locked cleaning position;
8. Cleaning the sealed cleaning space 400; and
9. Complete opening of the cleaning space 400 while simultaneously releasing the lock between the pipe sockets 10, 100, 100'.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

What is claimed is:

1. An apparatus for coupling first and second storage and/or transport units for a transfer of a product from a first unit into a second unit, comprising:
   the first unit having a first closing flap in a first pipe socket at a first end;
   the second unit having a second closing flap in a second pipe socket at a second end;
   first and second shaft sections in respective active connection with the first and second closing flaps;
   the closing flaps being movable by the shaft sections from a closed position into a cleaning position, then into an open position, and then from the open position back into the cleaning position;
   in the closed position the first closing flap tightly closes the first unit off from atmosphere at said first end, the second closing flap tightly closes the second unit off from the atmosphere at said second end, and wherein at least one of the first and second closing flaps and the first and second pipe sockets are movable relative to one another;
   in the cleaning position at least one of the first and second closing flaps and the first and second pipe sockets are spaced from one another to define a cleaning space connectible to a cleaning device;
   in the open position the closing flaps lie on one another and at least one flow-through opening for the product is open from the first unit into the second unit;
   a first substantially annular seal between the first closing flap and the first pipe socket;
   a second substantially annular seal between the second closing flap and the second pipe socket;
   a third substantially annular seal between the first pipe socket and the second pipe socket;
   the second shaft section cooperating with a shaft;
   a fourth substantially annular seal between the second pipe socket and said second shaft section of the second closing flap; and
   the first, second, third and fourth seals sealing the cleaning space off from both the atmosphere as well as the product.

2. The apparatus according to claim 1 wherein the first shaft section comprises a first semi-axis, the second shaft section comprise a second semi-axis, and the first semi-axis and the second semi-axis complement one another to form a full axis.

3. The apparatus according to claim 1 further comprising an actuation device via which a safety device is driven for changing from the closed position into a locked position wherein the first and second units are sealed relative to one another and at least one of the first and second closing flaps and the first and second pipe sockets are firmly joined to one another, and a swivel device driven for changing from the locked position into the open position as well as from the open position into the locked position, and the safety device being driven for changing from the locked position into the closed position.

4. The apparatus according to claim 3 wherein the actuation device comprises a gear device with a drive shaft and at least first and second output shafts, the two output shafts being driven by the drive shaft in alternating fashion.

5. The apparatus according to claim 4 wherein the safety device has an active connection with the first output shaft and with the two pipe sockets, the safety device comprising a connection element between the first pipe socket and the second pipe socket that is turned around a first axis for locking the two pipe sockets relative to one another or for unlocking them.

6. The apparatus according to claim 5 wherein the connection element comprises at least one of a projection and a recess, and the at least one of the projection and recess of the connection element being in firm engagement with one of a recess and a projection of at least one of the first pipe socket and of the second pipe socket in the locked position, at least one of each projection and each recess of the at least one of the connecting element and the pipe socket describing an angle relative to the first axis at least in regions in order to move the closing flaps away from one another or toward one another.

7. The apparatus according to claim 4 wherein the swivel device has an active connection with the second output shaft forming at least one shaft and with at least one of the two closing flaps for turning the closing flaps around a second axis, where the swivel device comprises first and second semi-axes.

8. The apparatus according to claims 7 wherein the second axis resides substantially perpendicular to the first axis.

9. The apparatus according to claim 1 wherein the cleaning position is approached both between the closed position and the locked position as well as between the open position and the locked position with at least one of the closing flaps and the pipe sockets that are at least partly firmly connected to one another.

10. The apparatus according to claim 1 wherein the first closing flap comprises a first end face with at least one of a depression and an elevation, the second closing flap comprises a second end face complementary with the first end face, and the two end faces lie tightly against one another at least in the open position, and in the cleaning position the end faces being sealed relative to one another in a region of the at least one of the depression and the elevation, and the cleaning space being substantially annular.

11. The apparatus according to claim 1 wherein the first dosing flap comprises at least one first recess at its side tying opposite a first end face, and the second closing flap comprises at least one second recess at its side lying opposite a second end face for enlarging the flow-through opening or openings in the open position, and at least one of the first recess and the second recess is substantially a segment-shaped spherical shape.

12. The apparatus according to claim 1 wherein in the open position, the first closing flap is at least partially in engagement with the second pipe socket and the second closing flap is at least partially in engagement with the first pipe socket.

13. The apparatus according to claim 12 wherein at least one of the first closing flap and the second closing flap comprises at least one partially annular projection concentric relative to a second axis for engagement into at least one partially annular recess in at least one of the first pipe socket and in the second pipe socket.

14. The apparatus according to claim 12 wherein at least one of the first closing flap and the second closing flap comprises at least one partially annular channel concentric relative to a second axis for engagement into at least one partially annular recess in at least one of the first pipe socket and in the second pipe socket.

15. The apparatus according to claim 1 wherein the first closing flap is a component part of a passive valve and the second closing flap is a component part of an active valve and a second semi-axis is firmly connected to the second output shaft.

16. The apparatus according to claim 1 wherein the cleaning device comprises a blower and extraction device for flooding the cleaning space with a fluid cleaning agent.

17. The apparatus according to claim 1 wherein the first, second, third and fourth seals are resistant to at least one of acids and bases.

18. The apparatus according to claim 1 wherein the cleaning space acts as a sluice.

19. The apparatus according to claim 1 wherein the cleaning space is brought to a pressure which is at least one of below atmospheric pressure and a pressure in a region of the flow-through opening.

20. The apparatus according to claim 1 wherein a sensing unit is provided for determining product concentration in the cleaning space.

21. The apparatus according to claim 20 wherein given downward crossing of a selectable limit value of the defined product concentration, the actuation device is enabled for driving the closing flap into the closed position.

22. An apparatus for coupling first and second units for a transfer of a product from a first unit into a second unit, comprising:

the first unit having a first closing flap in a first pipe socket;

the second unit having a second closing flap in a second pipe socket, said second closing flap having a shaft section;

the closing flaps being movable from a closed position into a cleaning position, then into an open position, and then from the open position back into the cleaning position;

in the closed position the first closing flap tightly closes the first unit off from atmosphere, the second closing flap tightly closes the second unit off from the atmosphere;

in the cleaning position at least one of the first and second closing flaps and the first and second pipe sockets are spaced from one another to define a cleaning space connectible to a cleaning device;

in the open position the closing flaps lie on one another and at least one flow-through opening for the product is open from the first unit into the second unit;

a first substantially annular seal between the first closing flap and the first pipe socket;

a second substantially annular seal between the second closing flap and the second pipe socket;

a third substantially annular seal between the first pipe socket and the second pipe socket;

a fourth substantially annular seal between the second pipe socket and said second shaft section of the second closing flap; and the first, second, third and fourth seals sealing the cleaning space off from both the atmosphere as well as the product.

* * * * *